United States Patent [19]

Hays

[11] 4,425,991

[45] Jan. 17, 1984

[54] AUTOMOTIVE CLUTCH IMPROVEMENTS

[76] Inventor: Bill J. Hays, 10582 Palladium Ave., Garden Grove, Calif. 92640

[21] Appl. No.: 264,585

[22] Filed: May 18, 1981

[51] Int. Cl.³ ............................................. F16D 13/42
[52] U.S. Cl. ................................ 192/70.27; 192/89 B; 192/99 A; 192/103 A
[58] Field of Search .................... 192/52, 70.27, 89 B, 192/99 A, 103 A, 103 R, 105 C

[56] References Cited

U.S. PATENT DOCUMENTS

| | | | |
|---|---|---|---|
| 2,234,756 | 4/1939 | Geyer | 192/70.27 X |
| 2,275,068 | 5/1939 | Ruesenberg et al. | 192/105 C |
| 2,630,897 | 10/1957 | Porter | 192/99 A X |
| 2,885,047 | 7/1957 | Kehrl | 192/89 B X |
| 4,200,176 | 4/1980 | Courbot | 192/89 B |
| 4,210,233 | 7/1980 | Courbot | 192/89 B |
| 4,241,819 | 12/1980 | Babcock et al. | 192/89 B X |

*Primary Examiner*—Rodney H. Bonck
*Assistant Examiner*—James J. Merek
*Attorney, Agent, or Firm*—Fischer, Tachner & Strauss

[57] ABSTRACT

There is disclosed an improved automotive clutch utilizing a clutch cover assembly having a conventional conical spring diaphragm which develops the axial force for loading of the pressure plate and which is modified in accordance with the invention to utilize centrifugal weights which increase the force applied to the pressure plate with increasing engine speed.

14 Claims, 25 Drawing Figures

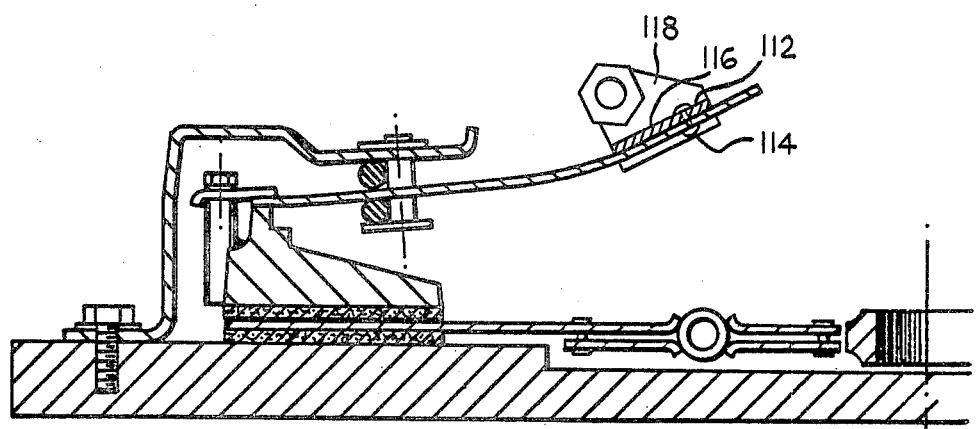
FIG. 11
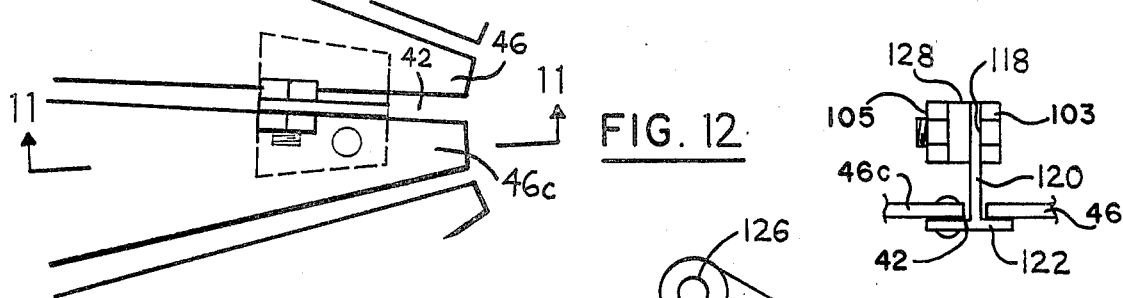
FIG. 12
FIG. 13
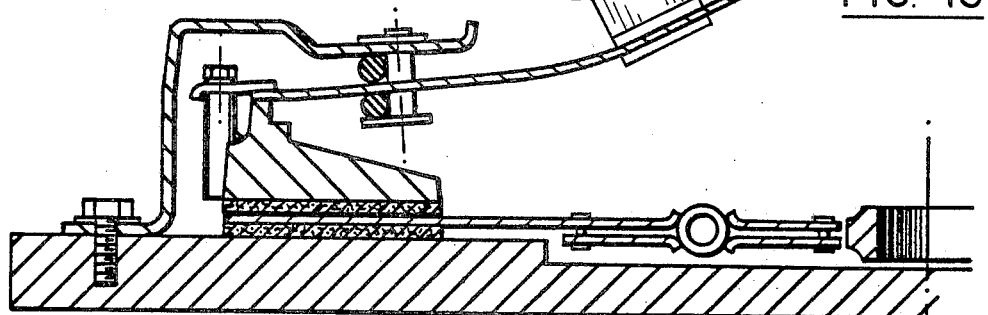
FIG. 14
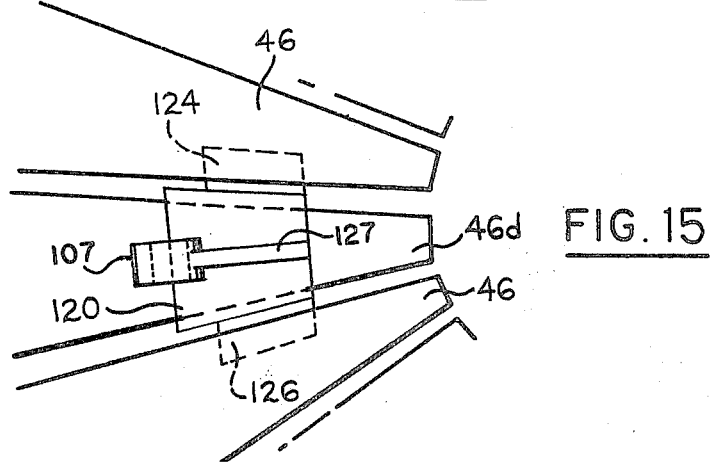
FIG. 15
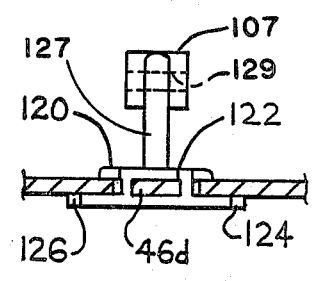
FIG. 16

AUTOMOTIVE CLUTCH IMPROVEMENTS

BACKGROUND OF THE INVENTION

1. Field of Invention

This invention relates to an automotive clutch and, in particular, to an improved clutch cover assembly useful in such a clutch.

2. Brief Statement of the Prior Art

The automotive clutches most commonly used by automotive manufacturers (OEM) incorporate a conical spring diaphragm for developing the pressure which is imparted to the pressure plate of the clutch assembly. The pressure plate frictionally engages with the clutch plate and slippage, if any, in the clutch assembly occurs between these members. The conical spring diaphragm typicaly used in automotive clutch applications is a modified Belleville spring in which a number of radial slots are cut in a conical spring member to permit flexing of the member when the clutch is disengaged and engaged and when the release bearing is forced against the conical spring diaphragm.

The conical spring diaphragm is mounted in the pressure plate subassembly in a position to exert an axial force on the pressure plate in its extended conical position and to release the pressure when flattened by the force applied by the release bearing during disengagement of the clutch.

The conical spring diaphragm is generally not suitable for use in high speed application since the pressure it exerts on the pressure plate is constant, independent of engine speed. Since this spring member must be provided with a tension that is sufficiently low to permit ease of disengagement of the clutch through the clutch pedal of the vehicle, the maximum pressure it can exert on the pressure plate is limited. This force is often inadequate for high speed applications and slipping occurs in the clutch. For this reason, specially designed clutches which utilize lever arms and compression springs have been used for racing applications. Centrifugal weights have been attached to these lever arms such that the centrifugal force developed by rotation of the pressure plate subassembly is applied to augment the force of the compression springs on the pressure plate. Centrifugal weights, however, have not been successfully used with diaphragm springs.

Another failing of the conical spring diaphragm, which can occur during ordinary use of the vehicle, is caused by over centering of the diaphragm which locks the clutch in a disengaged position. The over centering occurs when the conical spring member is moved past its flat or center position and resiliently moves to a reversed position with the clutch permanently disengaged, requiring dismantling of the clutch to restore the diaphragm to its proper position.

BRIEF STATEMENT OF THE INVENTION

This invention comprises a conical spring diaphragm clutch cover assembly that incorporates weights which are located out of the plane of the diaphragm and which are mechanically coupled to the diaphragm to apply the centrifugal force developed by the weights upon rotation to the diaphragm and pressure plate subassembly for urging the conical extension of the diaphragm and the resulting enhancement of pressure to the pressure plate. The invention thereby provides a clutch cover assembly which develops increasing pressure on the pressure plate with increasing engine speed and prevents over centering of the diaphragm since the centrifugal force developed upon rotation of the clutch cover assembly restores the correct position of the conical spring diaphragm.

In its simplest embodiment, the invention comprises one or more weight members which are attached to the radial fingers of the conical spring diaphragm at a position above the base plane of the diaphragm. Other embodiments of the invention utilize weights pivotally mounted on the cover of the clutch cover assembly and mechanically coupled through a lever arm to the fingers of the conical spring diaphragm.

BRIEF DESCRIPTION OF THE DRAWINGS

The invention will be described with reference to the figures of which:

FIGS. 11–13 illustrate another centrifugal attachment member for modification of a clutch pressure cover assembly in accordance with the present invention;

FIGS. 14–16 illustrate a centrifugal weight attachment member which evenly distributes centrifugal force to its supporting area of the conical spring diaphragm;

DESCRIPTION OF PREFERRED EMBODIMENTS

Figure 1:
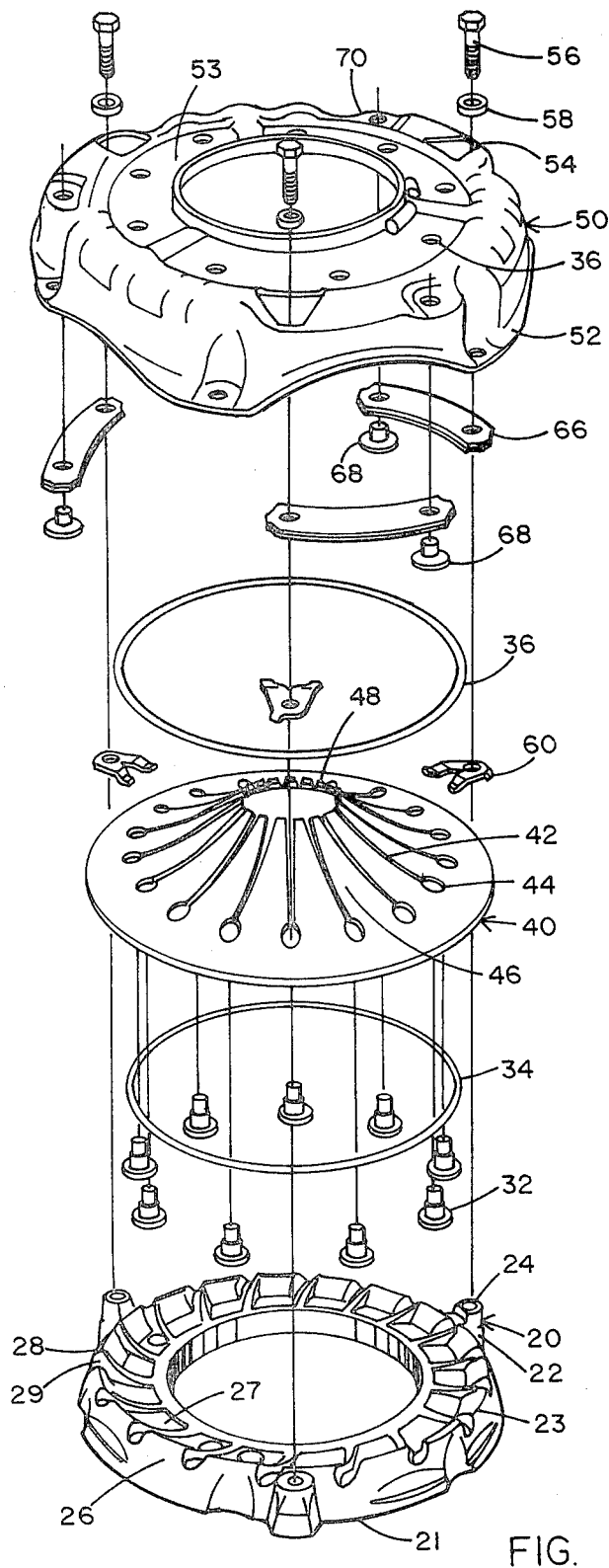
FIG. 1 is an exploded view of a clutch cover assembly of conventional automotive clutch.

Referring to FIG. 1, a conventional clutch cover assembly is shown in exploded view. The clutch cover assembly comprises a pressure plate 20 generally formed of an annular ring with a smooth undersurface 21 and a plurality of angularly spaced bosses 22 which are bored and tapped at 24 to receive machine bolts 56.

The upper face 23 of the pressure plate 20 has an upstanding rim 28 with a plurality of radial slots 29 angularly spaced thereabout in equal angular increments. The inner face portion 27 of pressure plate 20 is beveled downwardly in a manner described more in detail hereinafter with reference to FIG. 2.

The assembly includes a conical spring diaphragm 40, also known as a Belleville spring, which has its outer peripheral edge engaged against the upper edge of rim 28 on the face of pressure plate 20. The conical spring diaphragm 40 is provided with a plurality of radial slots 42 that are spaced in equal angular increments thereabout and which project from the inner, apex 48 of the diaphragm to intersect each of a plurality of annularly spaced apertures 44. The radial slots 42 thereby define a plurality of radial fingers 46 that project inwardly and upwardly on diaphragm 40.

Diaphragm 40 is supported in the assembly by a plurality of fasteners such as rivets 32 which project through apertures 44. These rivets 34 also secure pivot ring 34 in the assembly. Ring 34 is secured to the underside of diaphragm 40 in a manner illustrated and described in greater detail with reference to FIG. 2.

A second, identical pivot ring 36 can be mounted on the upper surface of diaphragm 40. The rings 34 and 36 are typically identical in thickness and diameters and both are secured by the plurality of rivets 32 to the underside of the pressure plate cover 52. Some clutch cover assemblies have an annular inset bead on the undersurface of the cover which serves as the upper annular fulcrum, thereby eliminating the upper fulcrum ring 36.

The pressure plate cover 52 surrounds the clutch cover assembly. The cover 52 is secured in the assembly by drive straps 66 which are mounted in the assembly; one end of each thereof being secured by a machine bolt 56 and the opposite end thereof secured by a rivet 68 which is received in an aperture 70 in cover plate 52.

Cover 52 has a generally flat annular land 53 which is provided with a plurality of angularly spaced bores 36 that receive rivets 32 whereby the assembly of fulcrum rings 34 and 36 and diaphragm 40 can be fixedly secured to the underside of the cover 52.

Figure 2:
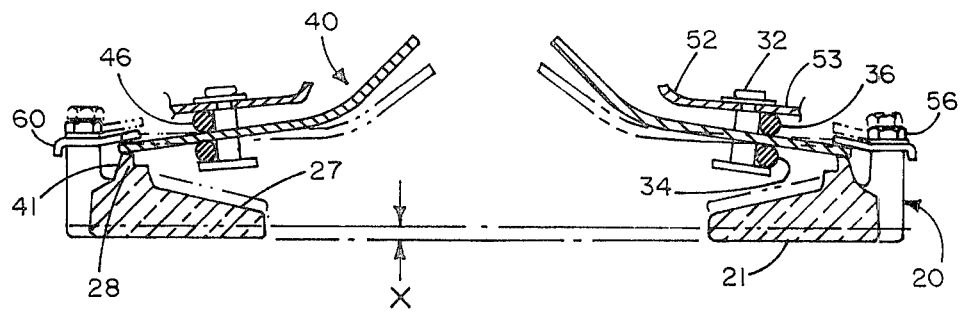
FIG. 2 is a cross-sectional elevational view of the clutch cover assembly.

Referring now to FIG. 2, the clutch cover assembly will be described in greater detail. As there illustrated, the clutch cover assembly is shown in cross-sectional elevational view. The pressure plate 20 has a flat undersurface 21 which engages the clutch disc and applies pressure thereto. The peripherally located bosses 20 are shown in this view receiving the machine bolts 56. The diaphragm 40 is illustrated in this view in two positions; the solid lines illustrating the clutch-engaged position and the phantom lines illustrating the position of the diaphragm when the clutch is disengaged, under pressure from the clutch release bearing.

The cover plate 52 is illustrated in this assembly with its generally flat annular land 53 receiving the rivets 32 and its undersurface supporting the diaphragm 40 wedged between the upper pivot ring 36 and the lower pivot ring 34. The peripheral edge 41 of diaphragm 40 engages the upstanding edges 28 on the upper face 27 of the pressure plate 20.

The pressure ring is secured in the assembly by the drive straps 66, one end of each is secured to the pressure ring 20 and the other end of each is secured to the underside of cover 50 by rivet 68, thereby rotationally interlocking these members while permitting their relative axial movement. Retractor springs 60 are provided at equal angular spacing about the periphery of the pressure ring 20 and machine bolts 56 secure the retractor springs in the assembly. The retractor springs mount on the upper ends of bosses 20 and the inside ends of the springs hook over the top of the conical spring diaphragm 40, interlocking the peripheral edge of the diaphragm to the pressure ring so that an upward flexing of this peripheral edge, which occurs when the diaphragm 40 is moved to the position shown in the phantom lines of FIG. 2, retracts the pressure plate distance X, also shown in FIG. 2.

Figure 4:
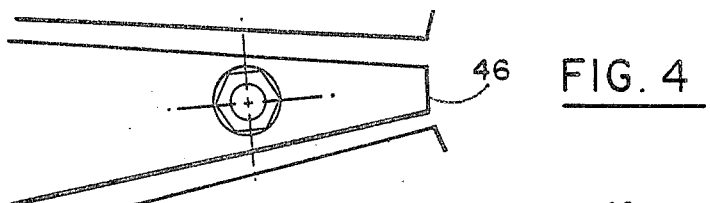
FIGS. 3 and 4 illustrate a modification of the clutch cover assembly in accordance with the present invention.
Figure 3:
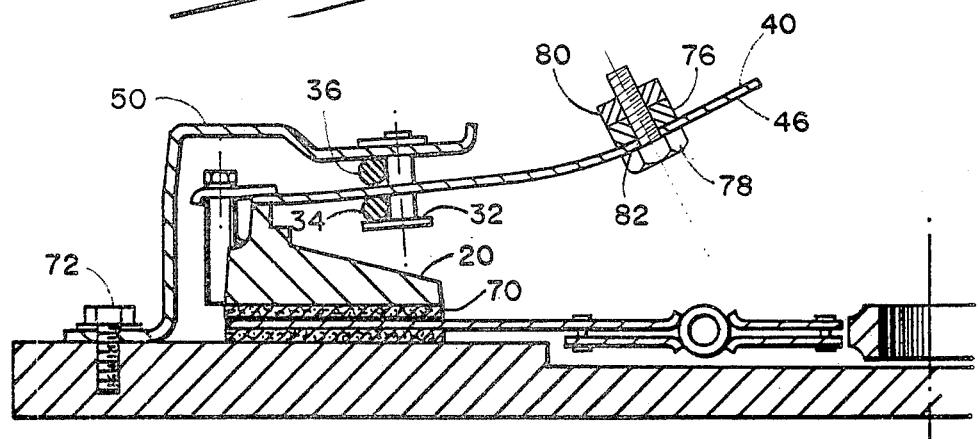

The clutch cover assembly, which is typical of the assemblies used in conventional clutches, is modified in accordance with the invention in the manner shown by FIGS. 3 through 25. Referring to FIGS. 3 and 4, the clutch cover assembly is shown in a typical clutch assembly. As there illustrated, cover 50 is mounted to the engine flywheel by machine bolts 72 and the pressure plate 20 is shown in engagement with the clutch disc 70. The diaphragm 40 is supported from the underside of cover 50 by the plurality of fasteners 32, retained between the upper and lower fulcrum rings 36 and 34, respectively.

The diaphragm of the invention is provided with a centrifugal weight assist to develop centrifugal force by one of a plurality of weights 76 which are secured to a like number of fingers 46 of diaphragm 40. Each weight is secured to its respective finger by a suitable fastening means such as a machine bolt 78 that extends through an aperture located intermediate the length of finger 46 and that is firmly attached by nut 80.

Figure 6:
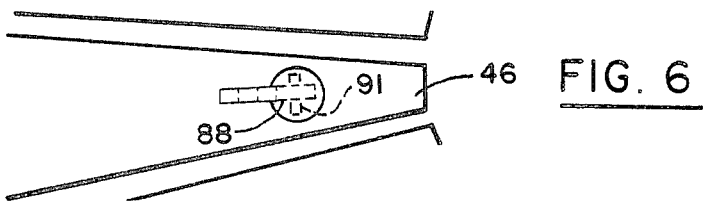
FIGS. 5 and 6 illustrate another modification to add weights to a clutch pressure cover assembly in accordance with the present invention.
Figure 5:
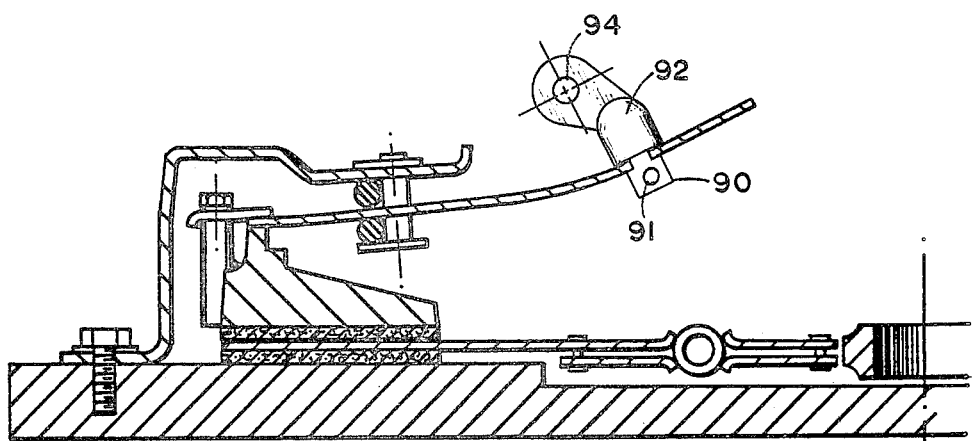

Referring now to FIGS. 5 and 6, another means for securing a centrifugal weight to the assembly is shown. As there illustrated, each finger 46 is provided with a rectangular slot 88 at an intermediate portion of its length. Slot 88 receives the flat sided shank 90 of mounting block 92. The shank 90 has an aperture 91 to receive a pin or wire ring 91 to secure block 92 to finger 46. Block 92 is provided with an aperture 94 in its upper end which can receive a machine bolt such as 78 to secure a weight such as 76 (shown in FIG. 3) to the assembly.

Figure 7:
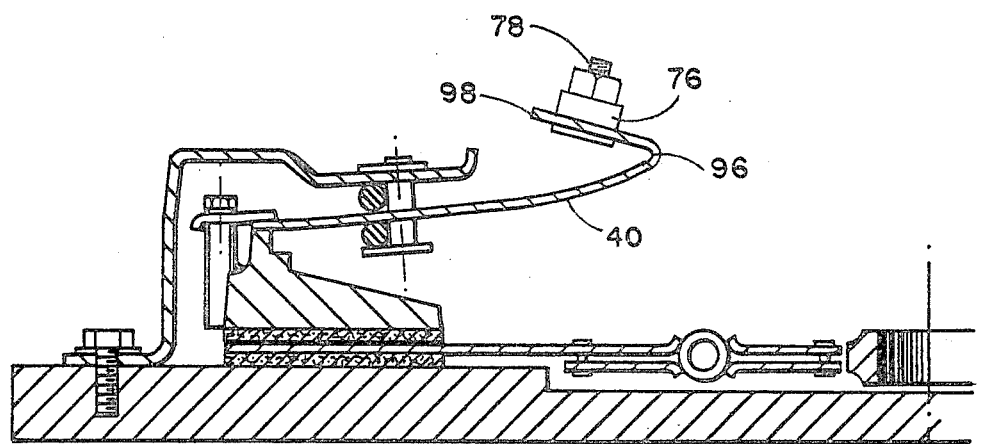
FIGS. 7 and 8 illustrate a simple modification of a clutch pressure cover assembly in accordance with the present invention.
Figure 8:
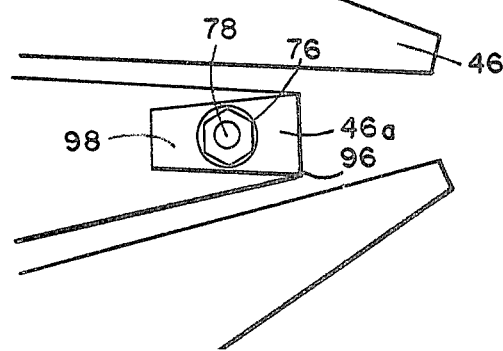

Another means for enhancing the centrifugal force assist to the diaphragm 40 of the clutch cover assembly is shown in FIGS. 7 and 8. As there illustrated, the ends of alternate fingers 46(a) are provided with a reverse bend at 96 to provide a short portion 98 that is positioned above the normal plane of the diaphragm so that its mass has a greater lever arm relative to the fulcrum rings 36 and 34 than the unmodified fingers 46 whereby the mass of the bent portions 98 enhances the centrifugal response of the diaphragm 40. This mass can be enhanced by the addition of weights 76 which can be secured to each bent finger 46a by a machine bolt or rivet 78 or by welding, similar to that shown in FIGS. 3 and 4.

Figure 10:
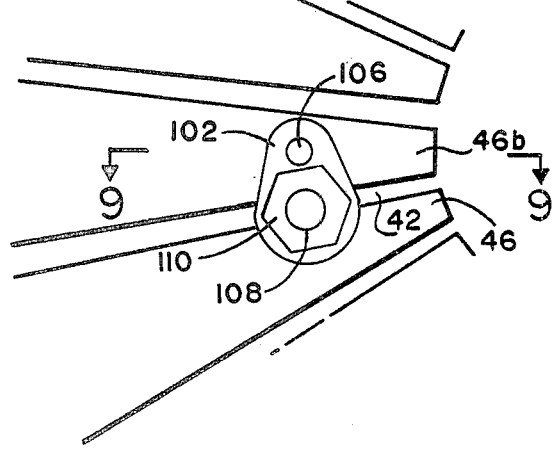
FIGS. 9 and 10 illustrate an adjustable centrifugal weight modification of a clutch pressure cover assembly in accordance with the present invention.
Figure 9:
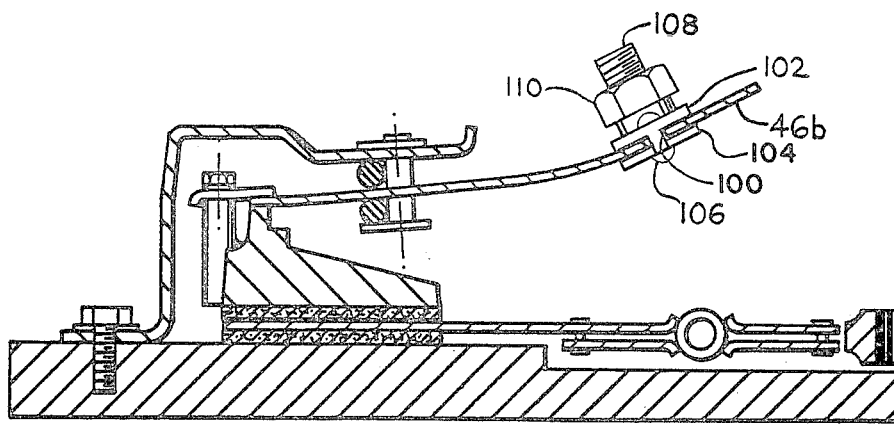
Figure 9A:
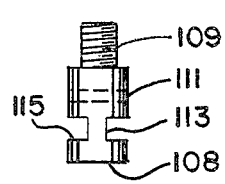

Referring now to FIGS. 9 and 10, an alternate centrifugal weight modification is shown. As there illustrated, alternate fingers 46(b) are provided with an aperture 100 at a point intermediate the lengths of these fingers 46(b) and an oblong washer 102 is mounted to the upper surface of finger 46(b) by suitable attachment means such as rivet 106. Rivet 106 extends through an eccentrically located aperture in the washer which has a large diameter aperture at its opposite end. The invention uses a plurality of studs shown in FIG. 9a, each having a threaded upper end 109 and a shank with a through bore 111 and a pair of parallel slots 113 and 115. These studs are slid into the radial slots 42 of the conical diaphragm 40 with the edges of adjacent fingers 46 received in slots 113 and 115 of the stud 108. The washer 102 is of sufficient length to position its large diameter aperture about stud 108, restraining the stud to the diaphragm. One or more nuts 110 and/or a weight such as 76 can be threadably engaged on stud 108 to add a controlled and variable amount of weight to the stud 108 whereby the mass of the centrifugal weight can be fixedly adjustable. The resultant weight is located symetrically to the two adjacent fingers 46(b) and 46 and the centrifugal force developed by the weights is evenly distributed to each of these fingers.

FIGS. 11-13 illustrate another embodiment of the invention whereby a weight assembly can impart a centrifugal weight loading to a pair of adjacent fingers 46 and 46(c). Finger 46(c) is modified in accordance with the invention by an aperture 112 that is located intermediate its length. The aperture 112 receives a fastener such as rivet 114 that extends through the aperture and a corresponding aperture of flange 116 of mounting bracket 118, whereby mounting bracket 118 is fixedly secured to the finger 46(c). The mounting bracket 118, shown in end view in FIG. 13 has an upright web 120 which is received in the radial slot 42 between fingers 46 and 46(c). Web 120 has a flange 122 distally secured thereto that extends beneath the undersurface of the adjacent, unmodified finger 46. The upright portion of bracket 118 has a aperture which receives a machine bolt 103 which, together with nut 105 provide attachment means for securing one or more of weights 128 in the assembly, providing a fixedly adjustable centrifugal weght mounting to the diaphragm.

FIGS. 14 and 15 illustrate another embodiment of the invention whereby a weight assembly can be mounted on one finger such as 46(d) and mechanically linked to transmit its force equally to finger 46(d) and to the adjacent unmodified fingers 46, located to either side of the modified finger 46(d). The weight assembly comprises a mounting bracket which has a generally box base 120 with a trapezoidal through opening 122 that is received over the end of the modified finger 46(d). The base 122 carries wing flanges 124 and 126 at opposite sides of its undersurface and these wings project beneath the undersurfaces of the adjacent fingers 46. The upper surface of box 120 has an upright flange 127 that distally supports a cylindrical block 107 having a central through aperture 129 which can receive a machine bolt and the like to permit mounting of one or more weights to the assembly, thereby providing a fixedly adjustable and controllable weight to the assembly. The centrifugal force developed by the weight is transmitted equally to each of the fingers 46(d) and the adjacent unmodified fingers 46, the latter being engaged by the wings 124 and 126.

Figure 17:
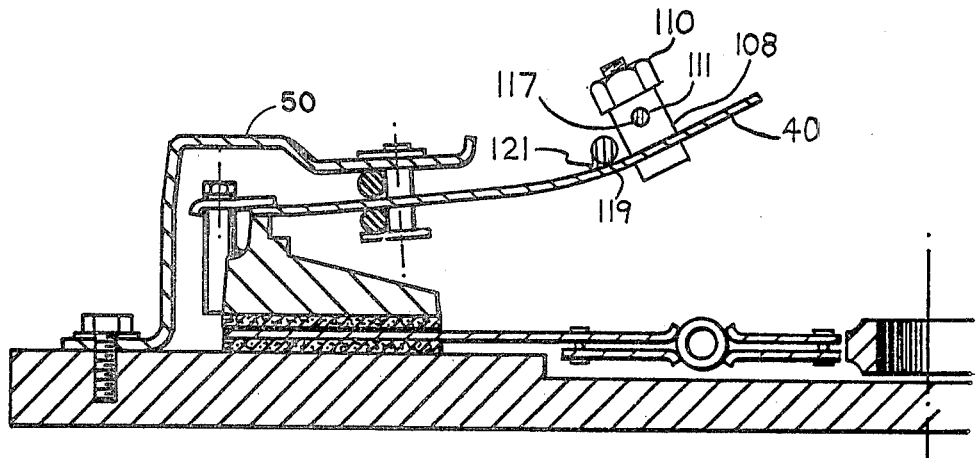
FIGS. 17 and 18 illustrate another centrifugal weight system for evenly distributing centrifugal force to the conical spring diaphragm.
Figure 18:
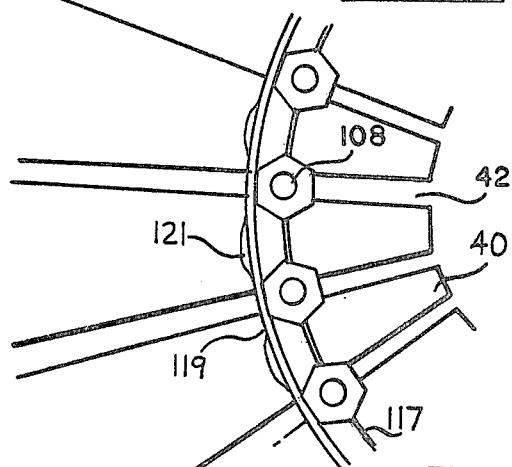

FIGS. 17 and 18 illustrate another embodiment in which a plurality of studs 108 (shown seperately in FIG. 9a) are mounted on diaphragm 40. Each slot 42 receives a stud 108 and the studs are interconnected by a spring wire discontinuous loop 117 which is passed through apertures 111 in the shanks of studs 108. Wire ring 119 is laid on the diaphragm 40, encircling the assembly of studs 108 and loop 117 and ring 119 is spot welded at 121 to one or more fingers 46, thereby preventing studs 108 from moving into interference with the inner edge of cover 50.

Figure 19:
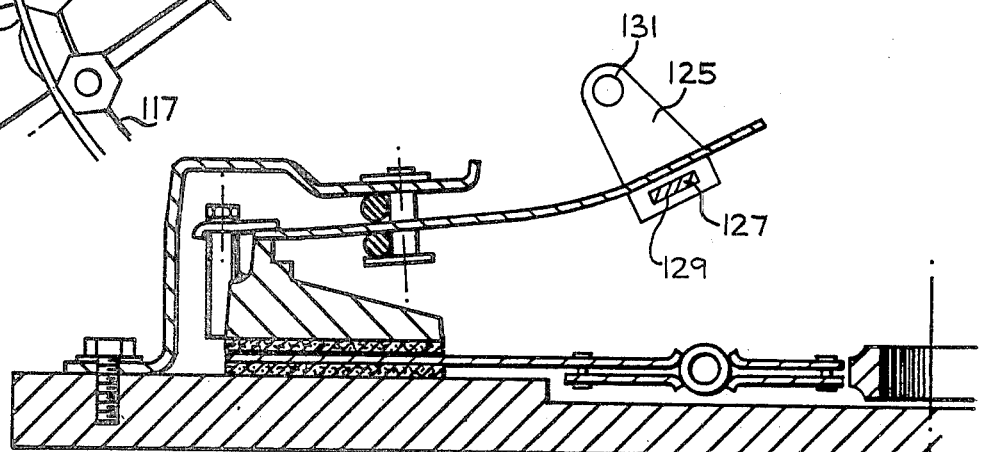
FIGS. 19–21 illustrate a centrifugal weight system using a mounting ring.
Figure 20:
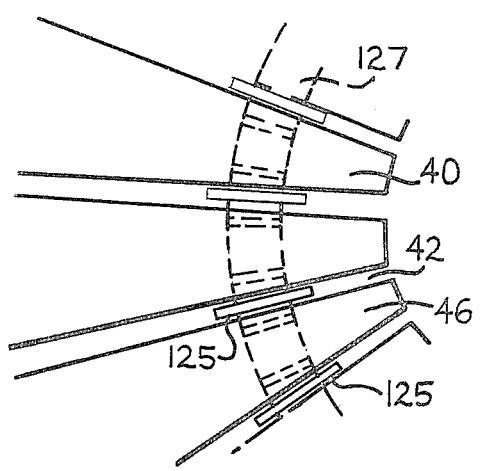
Figure 21:
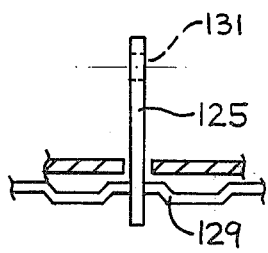

FIGS. 19-21 show another embodiment in which each radial slot 42 of diaphragm 40 receives a mounting plate 125. Each plate 125 has a slot 127 at its bottom edge and waffle ring 129 (see FIG. 21) extends along the undersurface of diaphragm 40, through the slots 127 of the plates 125. The waffle ring secures the upright mounting plates 125 in the assembly. Each plate 125 has a distal aperture 131 for mounting of a weight such as weight 76 with a bolt such as 78, shown in FIGS. 5 and 6.

Figure 22:
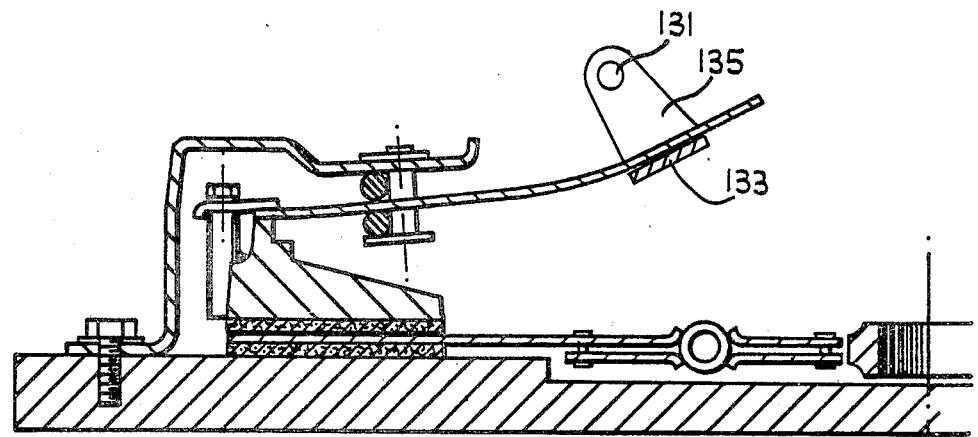
FIGS. 22 and 23 illustrate a single piece mount for a a plurality of centrifugal weights.
Figure 23:
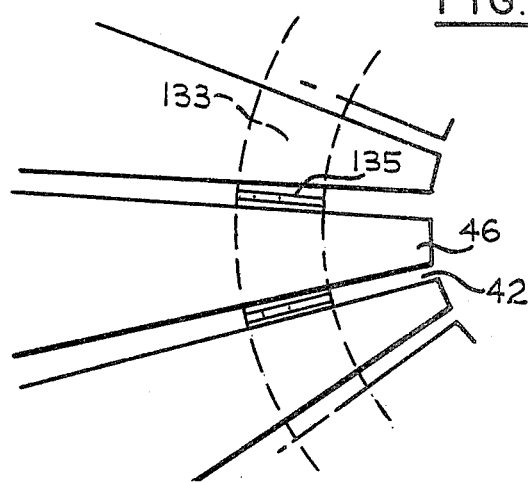

The assembly of mounting plates and ring can be integral, as shown in FIGS. 22 and 23. This embodiment has a single element, ring 133, which has a plurality of upright ears 135 spaced at equal angular increments on its upper surface so that an ear 131 can be positioned in each radial slot 42. Each ear 135 has a distal aperture 131 in which can be placed a bolt or rivet to attach a weight such as 76 shown in FIGS. 5 and 6.

Figure 25:
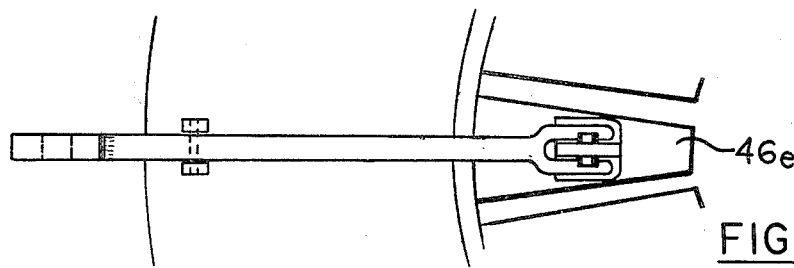
FIGS. 24 and 25 illustrate a lever system to incorporate centrifugal weights in a clutch cover assembly in accordance with the present invention.
Figure 24:
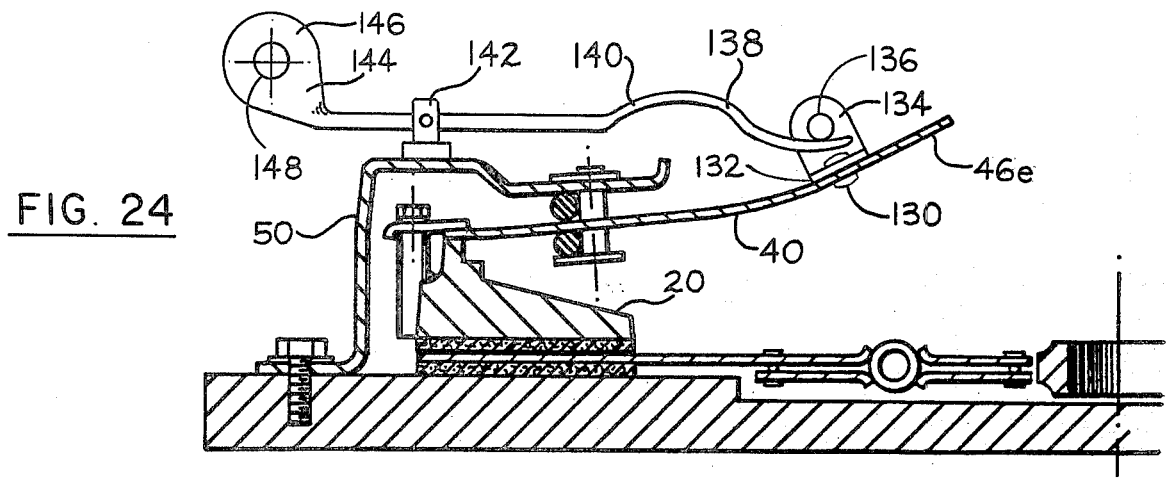

Referring now to FIGS. 24 and 25, another embodiment of the inventon is shown. As there illustrated, one or more of the fingers 46(e) is modified by an aperture which receives a fastener such as rivet 130 that secures the base 132 of a bracket 134 to the uppersurface of the finger 46(e). Bracket 134 supports a pin 136 which is engaged by the free end 138 of lever 140 which is pivotally mounted to cover 50 by a bracket 142. The opposite end 144 of lever 140 has a generally circular flange 146 with a central aperture 148 to mount a weight thereto using a suitable fastener such as machine bolt and the like. The centrifugal force developed on rotation of the assembly is transmitted by lever arm 140 and bracket 134 to the undersurface of finger 46(e), resulting in an enhanced pressure transmitted to the pressure plate 20.

The invention as thus described provides for a centrifugal loading or assist to a conical spring diaphragm type clutch cover assembly used in a clutch assembly. Any of a variety of means for positioning a plurality of centrifugal weights in the assembly can be provided so long as the centrifugal force developed by the supplemental weights is transmitted to the conical spring diaphragm to urge its conical extension whereby the centrifugal force enhances the pressure loading on the pressure plate. This results in a number of highly beneficial functions of the clutch utilizing the clutch cover assembly modified in accordance with the invention. One beneficial operation is that the modified clutches will not lock in the disengaged position by over centering of the conical spring diaphragm. Any tendency for the diaphragm to move to an over centered position will be overcome by the centrifugal forces of the centrifugal weights, the magnitude of which increases with increasing engine speed. Another highly beneficial function is that the pressure loading of the assembly increases dramatically with increasing engine speed so that the clutch cover assembly can be utilized at a wide range of engine speeds, including speeds surpassing the maximum presently utilized with pressure plate assemblies of the conical spring diaphragm structure. The fixed adjustability of the masses of the weights is desirable since this can provide custom application; heavy weights utilized for high torque, low speed applications, and light weights utilized for high speed applications. In this manner, a single clutch size and model can be used in a wide variety of applications, e.g., in passenger cars, trucks and four wheel drive vehicles.

Preferably, the centrifugal weights are mounted in a fashion shown in the illustration to apply the centrifugal forces developed upon rotation evenly across the entire surface of the conical spring diaphragm whereby this member responds uniformly and applies loading equally about the peripheral engagement with the pressure plate, thereby insuring against warpage or uneven loading of the pressure plate and associated clutch disc.

The invention has been described with reference to the illustrated and presently preferred embodiments. It is not intended that the invention be unduly limited by this disclosure of presently preferred embodiments. Instead, it is intended that the invention be defined by the means, and their obvious equivalents, set forth in the following claims:

What is claimed is:

1. In a clutch cover assembly comprising a pressure ring for application of axial pressure to a clutch plate, a cover plate attached thereto forming a pressure plate chamber, a conical diaphragm spring mounted within said chamber and having a plurality of radial slots defining a plurality of radial fingers for engagement with a clutch release bearing, fulcrum means annularly spaced about said conical diaphragm spring to provide a fulcrum therefore whereby compression of said conical diaphragm spring releases pressure on said pressure plate, the improvement which comprises: a plurality of weight means, one each received in a respective radial slot of said diaphragm spring and mechanically interlocked to the immediately adjacent fingers of said diaphragm spring to develop a centrifugal force upon rotation and said plurality of weights being evenly spaced about and located above said diaphragm spring to transmit said force evenly across the surface of said diaphragm spring to urge the conical extension of said spring.

2. The assembly of claim 1 wherein one each of said plurality of weight means is received in each of said radial slots and each comprises weights located above the plane of said fulcrum means.

3. The assembly of claim 2 wherein each of said weight means includes fixedly adjustably attachment means whereby the location of said weight means on said diaphragm spring can be varied.

4. The assembly of claim 1 wherein each of said weight means includes a plurality of interchangeable weights of varied means whereby the mass of said weight means can be varied.

5. The assembly of claim 1 wherein said weights are attached to stud means having a shank with a pair of parallel slots to permit inserting said stud means into the radial slots of said conical spring diaphragm, receiving the edges of adjacent fingers in said slots whereby a plurality of said studs can be mounted in a circular array on said diaphragm.

6. The assembly of claim 5 including locator means to hold said studs at predetermined positions on said diaphragm.

7. The assembly of claim 6 wherein said locator means is a plate, secured at one end to a finger and having, at its opposite end, an aperture which receives said stud.

8. The assembly of claim 6 wherein said mounting studs have a transverse through bore and said locator means is a continuously circular spring wire loop passing through a circular alignment of said through bores.

9. The assembly of claim 8 wherein said locator means also includes a circular wire ring encircling the circular array of studs.

10. The assembly of claim 1 wherein a plurality of weights are attached, one each to a respective one of a plurality of plates located in the radial grooves of said diaphragm and carried on a ring beneath said diaphragm.

11. The assembly of claim 10 wherein said plurality of plates are integral with said ring.

12. In a clutch cover assembly comprising a pressure ring for application of axial pressure to a clutch plate, a cover plate attached thereto forming a pressure plate chamber, a conical diaphragm spring mounted within said chamber and having a plurality of radial slots defining a plurality of radial fingers for engagement with a clutch release bearing, fulcrum means annularly spaced about said conical diaphragm spring to provide a fulcrum therefore whereby compression of said conical diaphragm spring releases pressure on said pressure plate, the improvement which comprises: a plurality of weights and a like plurality of weight mounting means, one each attached to and supported above alternate fingers, and including flange means dependent from each mounting means projecting beneath an adjacent finger, whereby each weight is interconnected to its supporting finger and an adjacent finger.

13. In a clutch cover assembly comprising a pressure ring for application of axial pressure to a clutch plate, a cover plate attached thereto forming a pressure plate chamber, a conical diaphragm spring mounted within said chamber and having a plurality of radial slots defining a plurality of radial fingers for engagement with a clutch release bearing, fulcrum means annularly spaced about said conical diaphragm spring to provide a fulcrum therefor whereby compression of said conical diaphragm spring releases pressure on said pressure plate, the improvement which comprises: weight means attached on lever means pivotably supported on said cover plate and including arm means extending therefrom to the underside of said fingers whereby centrifugal forces developed by said weight means are applied to urge the conical extension of said diaphragm spring.

14. The assembly of claim 13 wherein said weight means includes a plurality of interchangeable weights of varied mass whereby the mass of said weight means can be varied.

* * * * *